United States Patent [19]

Church et al.

[11] 4,355,553
[45] Oct. 26, 1982

[54] PORTABLE TURNING TOOL

[76] Inventors: Fredrick Z. Church, 27 Vandenberg Ct., Travis Air Force Base, Calif. 94535; Calvin M. Swesey, 149 Glasgow Way, Vacaville, Calif. 95688

[21] Appl. No.: 185,470

[22] Filed: Sep. 9, 1980

[51] Int. Cl.³ .................. B23B 5/00; B24B 19/00
[52] U.S. Cl. .................. 82/4 R; 29/27 B; 51/244
[58] Field of Search .......... 82/4 R, 4 C; 29/27 B, 29/27.2; 409/176; 51/244

[56] References Cited

U.S. PATENT DOCUMENTS

| | | | |
|---|---|---|---|
| 586,514 | 7/1897 | Bosworth | 82/4 R |
| 632,666 | 9/1899 | Wilkie | 51/244 |
| 651,342 | 6/1900 | Carr | 29/27 B X |
| 855,877 | 6/1907 | Bryant et al. | 51/244 |
| 857,931 | 6/1907 | Frick | 82/4 R |
| 971,753 | 10/1910 | Hunt | 82/4 R |
| 1,598,077 | 8/1926 | Halliday | 29/27.2 |
| 1,903,101 | 3/1933 | Faley | 51/407 |
| 1,935,805 | 4/1931 | Luft | 51/244 |
| 2,281,307 | 4/1942 | Johnson | 82/4 R |
| 3,965,623 | 6/1976 | Grutza | 51/28 AR |
| 4,177,610 | 12/1979 | Farkas | 51/241 S |

*Primary Examiner*—R. L. Spruill
*Assistant Examiner*—P. M. Heyrana
*Attorney, Agent, or Firm*—Donald J. Singer; Jacob N. Erlich

[57] ABSTRACT

A portable turning tool for removing material from a worn component of a device such as a motor generator. The portable turning tool has a support member which is fixedly secured to the device in such a position so as to have a centrally located opening therein aligned with an opening formed in the support structure of the device. A rod having a cutter bit at one end and an actuator at the other end is passed through the pair of openings thereby positioning the cutter bit adjacent the worn component. By providing means on the support member for permitting the rod to slide but not rotate with respect thereto, sliding movement of the rod and thereby the cutter bit across the worn component while simultaneously rotating the component allows material to be removed from the component without disassembling the device during the turning operation.

10 Claims, 3 Drawing Figures

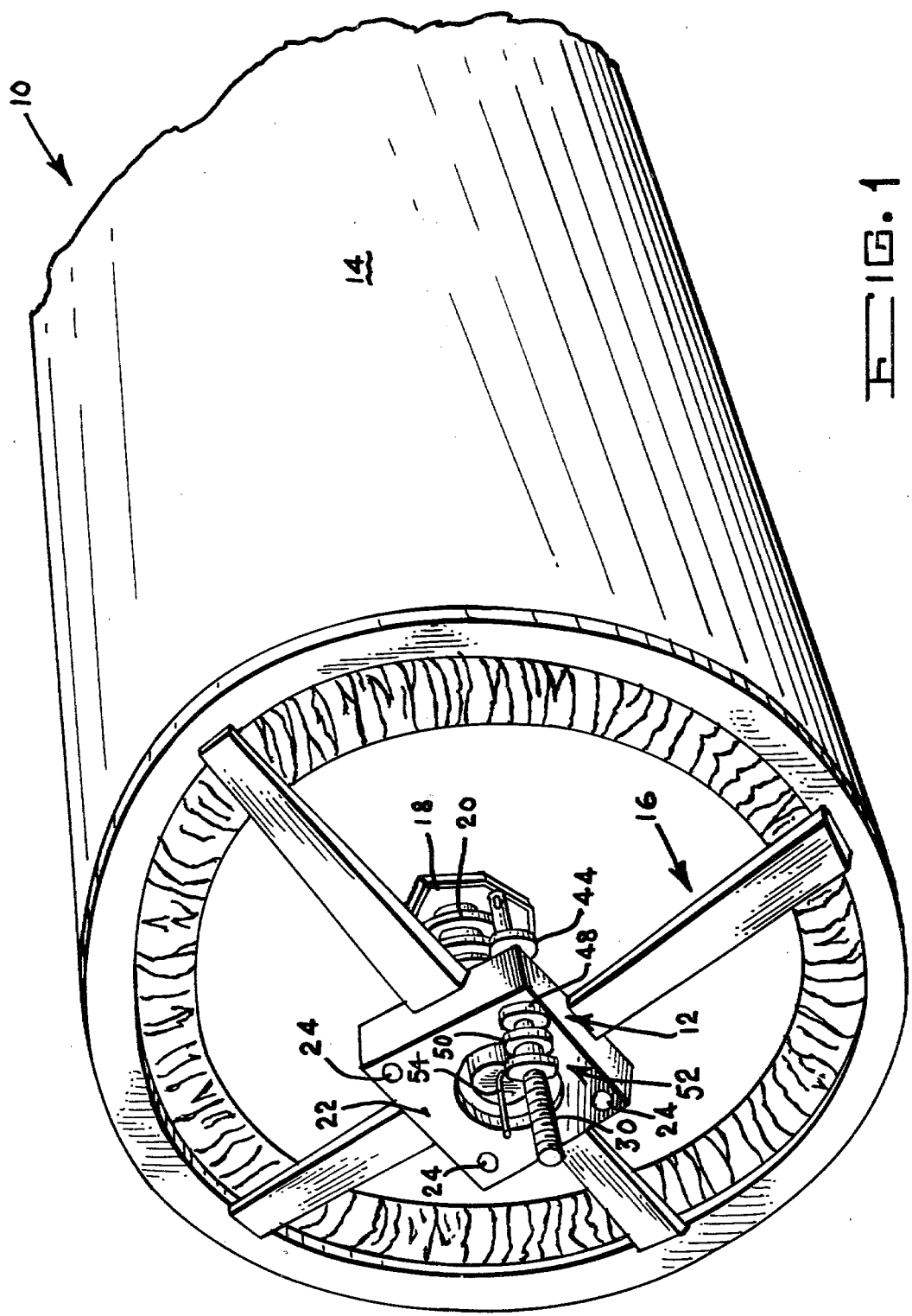

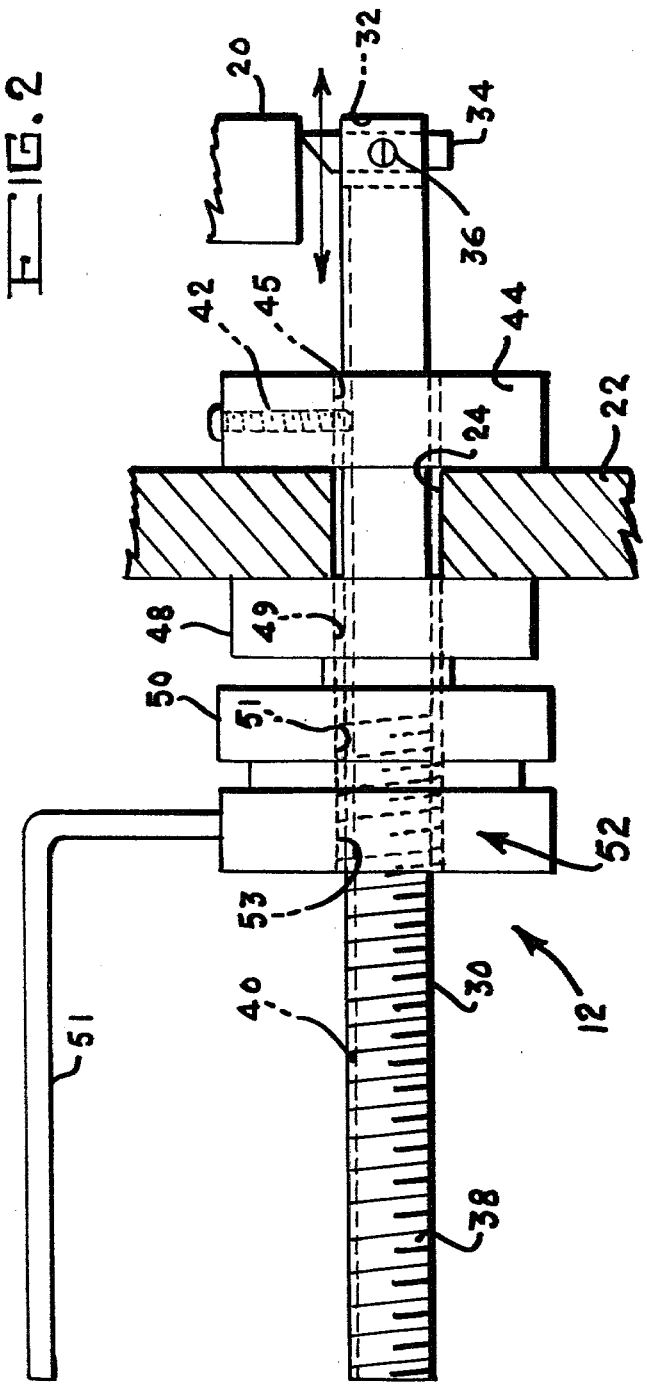
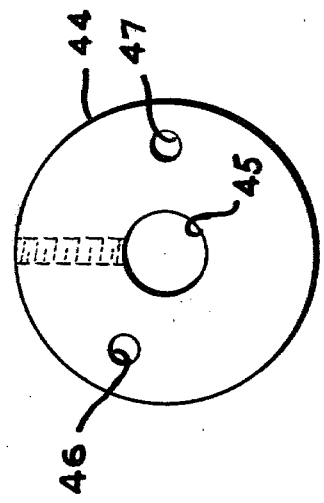

PORTABLE TURNING TOOL

STATEMENT OF GOVERNMENT INTEREST

The invention described herein may be manufactured and used by or for the Government for governmental purposes without the payment of any royalty thereon.

BACKGROUND OF THE INVENTION

This invention relates generally to turning tools, and, more particularly to a portable turning tool which has specific applicability in turning the worn slip rings of motor generators without the necessity of disassembling the generator.

There are many instances when it becomes necessary to turn or true worn parts of machinery or the like, and in particular the slip rings on motor generators. For example, when the slip rings on motor generators become worn they are required to be turned until they clean up within 0.0002 of an inch maximum indicator run out. Since the total weight of such a generator may be more than 5,000 lbs. with the armature itself weighing approximately 2,500 lbs., it takes two mechanics approximately eight hours each to tear down or disassemble the generator and prepare the disassembled generator for shipping to a facility capable of turning the slip rings.

Upon return of the generator it takes two mechanics approximately ten hours each to re-install the armature and check out the operation of the generator. A total expenditure of time, without counting the actual turn down time would be approximately 36 man hours. The actual overall time would also include the time necessary to ship the generator to another facility to turn the armature. Including shipping and receiving time it would generally take approximately six months before the generator could be placed back in service.

It is therefore essential, not only in industries which rely upon motor generators, but also in any industry in which elements thereof require turning down or trueing to be able to accomplish or perform this task in a minimal amount of time and preferably at the location at which the device is situated. Heretofore, attempts to solve the above problems have involved machinery so complex as to render the on-site operation impractical.

SUMMARY OF THE INVENTION

The instant invention overcomes the problems encountered in the past by providing a portable turning tool which is operable with a device, such as a motor generator, in which elements thereof are required to be turned down or trued.

The turning tool of this invention is portable and allows one machinist to turn the slip rings of, for example, a motor generator, in the field and in its present location. This is accomplished by incorporating the portable turning tool of this invention within the supporting structure of the motor generator.

Motor generators generally include a supporting structure in which is formed a bearing assembly for rotatably mounting the slip rings. In most instances the supporting structure or bearing assembly also has a plurality of openings therein adjacent the slip rings. The portable tool of this invention is utilized in conjunction with the openings within the supporting structure or bearing assembly.

More specifically, the turning tool of the present invention is made up of a rod having an appropriately sized diameter so as to be able to be passed through the abovementioned opening and thereby be located adjacent the slip rings or elements to be turned down or trued. Adjustably secured to one end of the rod is a cutting or grinding bit. Slidably mounted upon the rod and located adjacent the bit is a support member which is fixedly secured to the supporting structure in a conventional manner. A notch within the rod is engagable by a set screw in the support member so as to prevent rotation of the rod. Located adjacent the outer end of the rod and abutting the supporting structure or bearing assembly is a thrust bearing and spacer element, both of which are slidable and rotatable upon the rod. Completing the turning tool of this invention is an actuator which is screwed onto the rod adjacent the spacer element and thrust bearing. An elongated protrusion extends from the actuator which can be utilized as a handle.

Once the turning tool is in position adjacent a slip ring, for example, to be ground or trued, the opposite end of the armature of the generator can be turned by use of a portable electric or pneumatic drill thereby spinning the slip ring against the grinding or cutting bit. The bit may be drawn along the edge of the slip ring by turning the actuator by means of the handle thereby moving, in a horizontal fashion, the grinding or cutting bit across the slip ring. After the trueing operation has taken place the turning tool can be removed and the generator can become operational once again.

As a result of the use of this invention, a machinist may take one hour or less to turn or true each of the four slip rings, for a possible total of approximately 4 man hours or less. Another individual can be utilized to rotate the armature of the generator using a pneumatic drill for a maximum of 4 hours. Field repair with the portable turning tool of this invention therefore requires a total of approximately 8 manhours or less. Since the slip rings are turned while in the exact position they will be used they can be turned to extremely close tolerances. This will also increase the useable life of the slip rings.

It is therefore an object of this invention to provide an turning tool which is portable and easily usable in the field.

It is another object of this invention to provide a portable turning tool which is easily adaptable to be used with motor generators or the like.

It is a further object of this invention to provide a portable turning tool which will substantially reduce the man hours necessary in turning or trueing worn elements such as slip rings.

It is still a further object of this invention to provide a portable turning tool which allows substantially greater accuracy in turning, since the turning tool is utilized directly upon the machine having components thereof to be turned.

It is still a further object of this invention to provide a portable turning tool which is economical to produce and which utilizes conventional, currently available components that lend themselves to standard mass producing manufacturing techniques.

It is still another object of this invention to provide a method for turning or trueing elements in the field.

For a better understanding of the present invention together with other and further objects thereof, reference is made to the following description taken in conjunction with the accompanying drawing and its scope will be pointed in the appended claims.

DETAILED DESCRIPTION OF THE DRAWING

FIG. 1 is a pictorial representation of a device such as a motor generator with which the portable turning tool of this invention is utilized;

FIG. 2 is a side elevational view shown partly in cross section of the portable turning tool of this invention; and FIG. 3 is an end view of the support member utilized to mount the portable turning tool of this invention on a device such as a motor generator.

DETAILED DESCRIPTION OF THE PREFERRED EMBODIMENT

Reference is now made to FIG. 1 of the drawing which pictorially represents a device, in the form of, for example, a motor generator 10 with which the portable turning tool 12 of this invention can be utilized. It should be realized that although a motor generator 10 is utilized in the following description with the turning tool 12 of this invention, this invention is not limited to utilization with only a motor generator but can be utilized with any device in which elements, components or workpieces thereof must be turned, ground, or trued, and in which this operation must take place in the field at the site of the device itself.

For illustrative purposes therefore, a conventional motor generator 10 will be described with sufficient detail to enable one of ordinary skill to operate the portable turning tool 12 of this invention. Making up motor generator 10 is a cylindrically-shaped housing 14 having a pair of supporting structures 16 at each end thereof. Each supporting structure 16 surrounds and encompasses the armature 18 of motor generator 10. Forming part of the motor generator 10 are a plurality, generally four in number, of slip rings 20. Slip rings 20 are rotably mounted within a bearing assembly 22 formed as part of supporting structure 16. Generally formed within bearing assembly 22 are a plurality of openings 24. These openings 24 are located in proximity to slip rings 20 and may in some instances be formed on other portions of the supporting structure 16.

Referring now to FIGS. 1 and 2 of the drawing a detailed description of the portable turning tool 12 of this invention will be given hereinbelow. Portable turning tool 12 is made up of a rod 30 which has located at one end thereof a slot 32 capable of accepting therein any conventional grinding or cutting bit 34. Bit 34 is held in position within slot 32 by a set screw 36 so that bit 34 may be adjusted in a direction perpendicular to the longitudinal axis of rod 30.

Located at the other end of rod 30 is a threaded portion 38, the usefulness of which will be described hereinbelow. Also located along an outer surface of rod 30 is a notch or keyway 40. Notch 40 is situated therein to be engaged by a set screw 42 forming part of a support member 44. Support member 44 is shown in more detail in FIG. 3 of the drawing and has a centrally located opening 45 therein in order to allow rod 30 to slide therethrough. The purpose of notch 40 is to prevent any rotation of rod 30 with respect to support member 44. During use of portable turning tool 12, support member 44 is fixedly secured to the bearing assembly 22 of supporting structure 16 of motor generator 10 by any suitable securing means such as bolts (not shown) which pass through a pair of openings 46 and 47 located within support member 44.

Also situated on rod 30 but in slidable as well as rotable relationship therewith is a thrust bearing 48 and a spacer element 50 each having centrally located openings 49 and 51, respectively, located therein. The remaining element of the portable turning tool 12 of this invention is in the form of an actuator 52 having a centrally located internally threaded opening 53 therein. Actuator 52 has a protrusion 54 operable as a handle 54 formed either as an integral part thereof or a separate part secured thereto by a conventional securing method such as welding.

MODE OF OPERATION

In operation, support member 44 is positioned adjacent bearing assembly 22 of supporting structure 16 with its central opening 45 aligned with opening 24 formed as part of bearing assembly 22. If such an opening 24 is not already present, opening 24 may be formed in bearing assembly 22 by any conventional drilling operation as long as the structural integrity of motor generator 10 is not adversely affected. Support member 44 is fixedly secured to bearing assembly 22 by any suitable securing members such as bolts (not shown) passing through openings 46 and 47.

Thereafter rod 30 of turning tool 12 is positioned through opening 24 within bearing assembly 22 and opening 45 in support member 44 so that notch 32 is positioned adjacent slip ring 20. At any time thereafter cutting bit 34 is placed within notch 32 so as to barely touch slip ring 20 (by approximately 0.001 inches). Bit 34 is secured in place by the tightening of set screw 36.

With rod 30 so positioned, set screw 42 of support member 44 is tightened to engage notch 40 in order to prevent any rotation of rod 30 with respect to bearing assembly 22 of supporting structure 16. On the other end of rod 30 thrust bearing 48 and spacer 50 are slid thereon. Actuator 52 is then threaded onto rod 30 so as to maintain the appropriate relationship between cutting bit 34 and slip ring 20.

Once turning tool 12 of this invention is positioned adjacent slip ring 20, an operator, utilizing a pneumatic drill, for example, engaging the opposite end of the armature of motor generator 10, proceeds to spin armature 10 at for example 600 RPM. As this spinning takes place, cutting bit 34 removes a minute amount of material from slip ring 20. A second operator, by slowly moving handle 54 of actuator 52, is able to draw rod 30 and thereby bit 34 across slip ring 20 as indicated by the arrows in FIG. 2 so as to true the outer surface of slip ring 20. Such an operation can be performed quickly and accurately without the disassembling of motor generator 10. Furthermore, since the turning operation takes place on the generator itself, greater accuracy of turning can be performed.

Although this invention has been described with reference to a particular embodiment incorporating a motor generator therein, it will be understood to those skilled in the art that this invention is also capable of further and other embodiments in combination with other devices which requiring a trueing operation to be performed thereon within the spirit and scope of the appended claims:

We claim:

1. A portable turning tool for removing material from a workpiece mounted for rotation within a rigid member, said tool comprising an elongated element, means adjustably mounted at one end of said elongated element for removing material from the workpiece positioned in contact therewith, means mounted upon said elongated element proximate said one end of said elongated element for slidably but nonrotatably supporting said elongated element with respect to the workpiece thereby positioning said material removing means in a predetermined position with respect to the workpiece, means on said supporting means for removably and nonrotatably securing said supporting means to the rigid member, means mounted upon said elongated element proximate the other end of said elongated element for moving said elongated element with respect to said supporting means, and means mounted upon said elongated element interposed between said moving means and said supporting means for spacing said moving means from said supporting means and permitting said elongated element to move with respect thereto whereby upon simultaneous rotation of the workpiece adjacent said material removing means and movement of said elongated element with respect to the workpiece, a preselected amount of material can be removed from the workpiece.

2. A portable turning tool as defined in claim 1 wherein said moving means comprises a threaded portion on said elongated element and a member having an internally threaded opening therein mounted upon said elongated element for operative interengagement with said threaded portion of said elongated element whereby rotation of said member with respect to said elongated element causes movement of said elongated element to take place with respect to said supporting means.

3. A portable turning tool as defined in claim 2 wherein said elongated element is in the form of a rod.

4. A portable turning tool as defined in claim 3 wherein said rod has a notch formed within the outer surface thereof along the longitudinal axis of said rod and means on said supporting member for engaging said notch thereby preventing the rotational movement of said rod with respect to said supporting means.

5. A portable turning tool as defined in claim 4 wherein said spacing means comprises a thrust bearing and a spacer element.

6. A portable turning tool for use with a device having a support structure, a component having a longitudinal axis, the component being capable of being rotated within the support structure about the longitudinal axis, and an opening in the support structure adjacent the component, said portable turning tool comprising an elongated element, means adjustably mounted at one end of said elongated element for removing material from the component when positioned in contact therewith, means having an opening therein removably and nonrotatably secured to the support structure for slidably but nonrotatably supporting said elongated element proximate said one end thereof thereby positioning said material removing means in a predetermined position with respect to the component, said openings in the support structure and said supporting means being aligned with one another and said elongated element passing through both said openings in a direction substantially parallel to the longitudinal axis of the component, means mounted upon said elongated element proximate the other end of said elongated element for moving said elongated element with respect to said supporting means, and means mounted upon said elongated element interposed between said moving means and said supporting means for spacing said moving means from said supporting means and permitting said elongated element to move with respect thereto whereby upon simultaneous rotation of the component adjacent said material removing means and movement of said elongated element with respect to the component, a preselected amount of material can be removed from the component.

7. The combination as defined in claim 6 wherein said moving means comprises a threaded portion on said elongated element and a member having an internally threaded opening therein mounted upon said elongated element for operative interengagement with said threaded portion of said elongated element whereby rotation of said member with respect to said elongated element causes movement of said elongated element to take place with respect to said supporting means.

8. The combination as defined in claim 7 wherein said elongated element is in the form of a rod.

9. The combination as defined in claim 8 wherein said rod has a notch formed within the outer surface thereof along the longitudinal axis of said rod and means on said supporting member for engaging said notch thereby preventing the rotational movement of said rod with respect to said supporting means.

10. A method of removing material from a component rotatably mounted within a support structure of a device without having to disassemble said device prior to removing said material from said component comprising the steps of:
    (a) fixedly and nonrotatably securing a support member having an opening therein to said support structure adjacent an opening in said support structure such that said opening in said support member aligns with said opening in said support structure,
    (b) passing an elongated element through said pair of openings in order to position said elongated element with a longitudinal axis substantially parallel to a longitudinal axis of said component and such that one end of said elongated element is located adjacent said component,
    (c) adjustably securing means to said one end of said elongated element for removing material from said component,
    (d) securing said elongated element to said support member in a slidable but nonrotatable manner, and
    (e) simultaneously rotating said component in said support structure and moving said elongated element longitudinally in contact with said component whereby said material removing means removes said material from said component.

* * * * *